(12) United States Patent
Kinzl et al.

(10) Patent No.: US 10,836,964 B2
(45) Date of Patent: Nov. 17, 2020

(54) METHOD AND DEVICE FOR PREPARING A VANADIUM-CONTAINING COMBUSTIBLE

(71) Applicant: Siemens Aktiengesellschaft, Munich (DE)

(72) Inventors: Markus Kinzl, Dietzenbach (DE); Ansgar Kursawe, Niedernhausen (DE); Sebastian Löw, Frankfurt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/315,738

(22) PCT Filed: Jun. 28, 2017

(86) PCT No.: PCT/EP2017/065985
§ 371 (c)(1),
(2) Date: Jan. 7, 2019

(87) PCT Pub. No.: WO2018/033284
PCT Pub. Date: Feb. 22, 2018

(65) Prior Publication Data
US 2019/0300797 A1 Oct. 3, 2019

(30) Foreign Application Priority Data
Aug. 19, 2016 (DE) .................. 10 2016 215 607

(51) Int. Cl.
*C10G 21/30* (2006.01)
*B01J 4/00* (2006.01)
*C10G 21/00* (2006.01)

(52) U.S. Cl.
CPC ............. *C10G 21/30* (2013.01); *B01J 4/001* (2013.01); *B01J 4/008* (2013.01); *C10G 21/003* (2013.01); *C10G 2300/205* (2013.01)

(58) Field of Classification Search
CPC .................. C10G 21/30; C10G 21/003; C10G 2300/205; B01J 4/001; B01J 4/008
See application file for complete search history.

(56) References Cited

U.S. PATENT DOCUMENTS

| 4,528,100 A | * | 7/1985 | Zarchy ............... B01D 11/0407 |
| | | | 208/251 R |
| 5,911,875 A | * | 6/1999 | Hervish ............... C10G 21/003 |
| | | | 208/309 |

(Continued)

FOREIGN PATENT DOCUMENTS

| CA | 2773584 A1 | 6/2011 |
| EP | 0757091 A1 * | 2/1997 ............. C10G 21/00 |

(Continued)

OTHER PUBLICATIONS

Sinnott, R. K.: "Chapter 2. Fundamentals of Material Balances" In: coul son, J. M., Ri chardson, J. F.: "Chemical Engineering vol. 6 An Introduction to Chemical Engineering Design", Pergamon Press, XP002774189, ISBN: 0-08-022970-0 Bd. 6, Seite 29, 47, 48, Seite 48; 1991.

(Continued)

*Primary Examiner* — Randy Boyer
*Assistant Examiner* — Juan C Valencia
(74) *Attorney, Agent, or Firm* — Wolter Vandyke Davis, PLLC

(57) ABSTRACT

A method and a device for preparing a vanadium-containing combustible in a de-asphalting device. In this way, a vanadium-containing combustible is supplied to a de-asphalting unit via a supply line in a de-asphalting device, wherein the vanadium-containing combustible supplied into the de-asphalting unit forms a first mass flow and a substantially de-asphalted combustible is discharged from the de-asphalting unit via a discharge line. A bypass line is connected to the supply line, wherein, via the bypass line, a second mass (Continued)

flow of the vanadium-containing combustible is directed past the de-asphalting unit in parallel to the first mass flow and supplied to the discharge line, such that a combined mass flow is formed in the discharge line.

10 Claims, 2 Drawing Sheets

(56) References Cited

U.S. PATENT DOCUMENTS

| | | |
|---|---|---|
| 2007/0215522 A1 | 9/2007 | Inage et al. |
| 2009/0057195 A1 | 3/2009 | Powers et al. |
| 2011/0073528 A1* | 3/2011 | Osaheni ............... C10G 21/003 208/309 |
| 2015/0315490 A1 | 11/2015 | Hanks et al. |

FOREIGN PATENT DOCUMENTS

| | | | |
|---|---|---|---|
| JP | 2007084753 A | 4/2007 |
| JP | 2009228475 A | 10/2009 |
| JP | 2016138277 A | 8/2016 |
| WO | 2016192895 A1 | 12/2016 |

OTHER PUBLICATIONS

PCT International Search Report and Written Opinion of International Searching Authority dated Oct. 20, 2017 corresponding to PCT International Application No. PCT/EP2017/065985 filed Jun. 28, 2017.

* cited by examiner

METHOD AND DEVICE FOR PREPARING A VANADIUM-CONTAINING COMBUSTIBLE

CROSS REFERENCE TO RELATED APPLICATIONS

This application is the US National Stage of International Application No. PCT/EP2017/065985 filed Jun. 28, 2017, and claims the benefit thereof. The International Application claims the benefit of German Application No. DE 10 2016 215 607.1 filed Aug. 19, 2016. All of the applications are incorporated by reference herein in their entirety.

FIELD OF INVENTION

This invention relates to a method for cleaning liquid combustibles (crude and heavy oils) which are provided for generating electrical energy in gas turbines. The main objective in the case of said cleaning lies in depleting heavy metals such as vanadium and nickel, the presence of said heavy metals in the exhaust gases created in the combustion potentially leading to corrosion in the gas turbines.

BACKGROUND OF INVENTION

Methods for the depletion (deasphalting) of heavy metals from liquid combustibles are already known from the prior art. An efficient demetallization of crude oils and heavy oils is possible in particular when deasphalting can be carried out using a antisolvent (deasphaltation means) which is composed of short-chain alkanes. Upon having performed the deasphaltation, said antisolvent is separated from the product mixture and returned to the process.

The deasphaltation described (depletion of heavy metals) is mandatory when heavy oils with in particular vanadium concentrations above 100 ppm are used for generating energy in gas turbines. By contrast, the reduction of the vanadium concentration in crude oils having a lower vanadium content is indeed not mandatory but is often advantageous for economic reasons.

Crude oils having a comparatively low vanadium content typically have vanadium concentrations between 10 and 20 ppm, such that said crude oils are indeed permitted to be combusted without pretreatment in robust standard gas turbines. However, the servicing effort is very high, and the combustion efficiency is significantly lower than in the use of previously demetallized crude oils. A reduction in the heavy metal contents leads to high savings in the sector of the gas turbine servicing costs.

The challenge herein lies in finding an economical optimum between the investment in and the benefit of deasphalting. Said challenge arises because ever higher savings in the sector of the gas turbine servicing costs are indeed possible by way of a (technically possible) increase in the depletion rate of the heavy metal; the separation costs associated with deasphalting however increase disproportionally above specific depletion rates, on the other hand (the separation costs include the investment and operating costs for the oil cleaning unit). The servicing costs usually relate to the vanadium content of the crude oils because vanadium is mainly responsible for the corrosion in the hot-gas path of the gas turbines.

When the vanadium-relevant gas turbine service costs, the reduction of said costs being pursued with the aid of the described technology for the depletion of vanadium, are compared with the costs of the depletion of vanadium by deasphalting, it can be seen that the vanadium concentration to be pursued by depletion should typically be in the range of 8 ppm when the optimum in economic terms is pursued. As has been indicated above, the depletion of vanadium to values below said target value would indeed enable additional savings in terms of service costs, but the costs of deasphalting would increase in a disproportionate manner such that a deterioration of the overall economic situation would result.

The question has to be raised how the possibility of being able to lower the vanadium concentration more than is economically expedient, said possibility being provided for technical reasons, can be utilized in a profitable manner. The implementable depletion rates are in the range from 60 to 80%. If one is to conservatively proceed from an exemplary depletion rate of 2/3, each oil of which the vanadium initial concentration is below 24 ppm could be depleted to concentrations below the target value of 8 ppm, this however not being expedient for economic reasons, as has been described.

Deasphalting to date is used only in the refinery sector but not for the pre-treatment of crude oils and heavy oils for applications in gas turbines. No process tailored to typical power station environments is known. Instead, detours which are very cost intensive, in particular with a view to the service complexity, are taken in the power station sector. Therefor, in the power station sector it is possible for a deasphalting process to be integrated in the power-station process and for excess energy from the power station to be utilized for heating steps of the deasphalting process such that the operating costs for the deasphalting are much lower in the power station sector than in the refinery sector where there is no free-of-charge excess energy available.

SUMMARY OF INVENTION

It is an object of the invention to specify a method and a device for operating a deasphalting for depleting vanadium in the range of the economical optimum.

The object of the invention directed toward a method is achieved by a method for preparing a vanadium-containing combustible in a deasphalting device, wherein a vanadium-containing combustible by way of an infeed line is fed to a deasphalting unit, wherein the vanadium-containing combustible fed into the deasphalting unit forms a first mass flow, and a substantially deasphalted combustible from the deasphalting unit is discharged by way of a discharge line. According to the invention, a bypass line is connected to the infeed line, wherein a second mass flow of the vanadium-containing combustible by way of the bypass line is directed in a manner parallel with the first mass flow past the deasphalting unit and fed to the discharge line, wherein a merged mass flow is formed in the discharge line.

The invention herein envisages operating the deasphalting process for depleting vanadium in the range of the economical optimum by introducing a bypass circuit and an associated control mechanism to create an installation. This installation is then useful when the deasphalting for technical reasons enables a higher depletion of vanadium than is required for the economical optimum. This case regularly arises in the case of typical crude oils, because the economical optimum is in most instances in the range of approx. 8 ppm, while the deasphalting by way of which vanadium can be reduced by at least 2/3 depletes all oils having vanadium initial concentrations of less than, for example, 24 ppm to final concentrations below the required approx. 8 ppm.

The invention herein is based on the realization that only a first mass flow (part-flow) of the crude oil feed flow is fed to the deasphalting unit by way of the infeed line and is cleaned in said deasphalting unit, while a second mass flow (part-flow) by way of the bypass line is directed past the deasphalting unit. This separation into two flows is referred to as a split. The bypass flow is subsequently mixed with the cleaned flow from the deasphalting unit. The advantage of the bypass circuit lies in particular in that only part of the feed flow has to be deasphalted. Accordingly, the deasphalting unit can be constructed so as to be smaller than in the case of the treatment of the entire feed flow. Accordingly, significantly lower investment and operating costs arise for the cleaning of oil, on account of which it becomes obvious that the implementation of this invention enables an operation in the range of the economical optimum.

By virtue of mixing, the mixed final product stream created has a concentration of vanadium which lies between the concentration of the flow cleaned by the deasphalting and that of the bypass flow (the bypass concentration corresponds to the crude oil feed concentration, since no treatment is performed in the bypass).

In the case of one advantageous refinement of the method, a control valve is disposed in the infeed line, and the bypass line is connected to the control valve, wherein an exit concentration of vanadium in the combustible in the merged flow is measured by a measuring device disposed in the discharge line, and the ratio between the first mass flow and the second mass flow is controlled by the control valve so as to proceed from the exit concentration of vanadium measured in the merged mass flow.

By suitably controlling the split ratio it is ensured that the exit concentration attained by way mixing corresponds to the economical optimum.

The closed control loop for setting the split ratio herein includes a control installation such as, for example, a three-way control valve, or the combination of two control valves for setting the first and the second mass flow.

In the case of one advantageous refinement of the method the ratio between the first mass flow and the second mass flow by means of a preset nominal value is controlled in such a manner that a largely consistent exit concentration of vanadium in the combustible in the merged mass flow is attained.

The split ratio herein is set based on a comparison of the nominal value and the provided actual value. The nominal value herein corresponds to a nominal value of a predefined concentration of vanadium, and the actual value so as to correspond to the actual value of the concentration of vanadium. The concentration of vanadium is determined with the aid of an analytical method. An in-line which enables a rapid determination of the concentration of vanadium and thus rapid controlling of the split ratio is advantageously used. In the case of an in-line method not being able to be used, it is possible for the concentration of vanadium to be determined by way of an off-line method and for the method to be subsequently made available to the split controller.

In the case of one advantageous refinement of the method the entry concentration of vanadium in the vanadium-containing combustible ahead of the control valve is additionally measured by a further measuring device, and the ratio between the first mass flow and the second mass flow is controlled conjointly with the exit concentration of vanadium in the combustible by the control valve.

Both signals, i.e. the entry concentration of vanadium and the exit concentration of vanadium, can be combined for advantageously controlling the split ratio. As soon as the deasphalting unit will have run for a duration, experience values pertaining to the correlation between the split-valve position and the typically attained concentration of vanadium in the merged mass flow will be available. The entry signal pertaining to the entry concentration of vanadium can then be used for controlling the split ratio as long as the exit concentration of vanadium does not depart from a permitted bandwidth about the nominal value.

The advantage of this control mechanism lies in that a significantly faster reaction to changes in the entry concentration is possible. The split ratio can be immediately readjusted upon measuring the entry concentration, even before the crude oil flows through the control valve (split valve). As opposed thereto, adapting the split ratio in the case of controlling based on the exit concentration is only possible once the crude oil has flowed through the entire deasphalting device up to the measuring location of the exit concentration at the exit (the dwell time is in the range of approx. one hour). If the permitted bandwidth about the nominal value is departed from, the exit concentration has to be used for controlling until the exit concentration again lies within the bandwidth.

The measurement of the entry and the exit concentration of vanadium can be performed in-line, thus continually in the operation, or else off-line, for example by retrieving specimens.

In the case of one further advantageous design embodiment of the method the first mass flow is set to approximately 2/3 and the second mass flow is set to approximately 1/3 of the vanadium-containing combustible. Setting in each case the first mass flow and the second mass flow to approximately half the vanadium-containing combustible is furthermore advantageous.

The object of the invention directed toward a device is achieved by a deasphalting device for purifying a vanadium-containing combustible, comprising a deasphalting unit which by way of an infeed line is capable of being fed a vanadium-containing combustible which forms a first mass flow, and from which deasphalting unit a substantially deasphalted combustible is capable of being discharged. According to the invention, a bypass line which connects the in feed line to the discharge line is furthermore comprised such that the vanadium-containing combustible in a second mass flow is capable of being directed past the deasphalting unit and fed to the substantially deasphalted combustible, and a merged mass flow is formed.

The advantages according to the invention of the deasphalting device and of the respective dependent claims are analogous to those of the method according to the invention.

In one advantageous embodiment of the deasphalting device a measuring device and a control valve disposed in the infeed line are moreover comprised, wherein the bypass line connects the control valve to a connector in the discharge line, and wherein the measuring device after the connector of the bypass line is disposed in the bypass line such that the concentration of vanadium in the combustible in the merged mass flow is measurable, and a ratio between the first mass flow and the second mass flow is capable of being controlled by the control valve so as to proceed from the exit concentration of vanadium measured in the merged mass flow.

In the case of one further advantageous design embodiment of the deasphalting device the ratio between the first mass flow and the second mass flow by means of a preset nominal value is capable of being controlled such that the exit concentration of vanadium in the combustible in the merged mass flow is largely consistent.

In one particularly advantageous embodiment of the deasphalting device a further measuring device is disposed in the infeed line ahead of the control valve, the entry concentration of vanadium in the vanadium-containing combustible being capable of being additionally measured by said further measuring device, and the ratio between the first mass flow and the second mass flow being capable of being controlled by means of the entry concentration of vanadium and the exit concentration of vanadium in the combustible.

In the case of the deasphalting device the entry concentration and/or the exit concentration of vanadium is advantageously capable of being measured. The measuring devices are thus specified for measuring the concentration of vanadium either in a crude oil flow (in-line measurement) or in a retrieved specimen (off-line measurement).

In the case of one advantageous embodiment of the deasphalting device the first mass flow corresponds to approximately 2/3 and the second mass flow corresponds to approximately 1/3 of the vanadium-containing combustible, and the first mass flow and the second mass flow furthermore advantageously correspond in each case to approximately half the vanadium-containing combustible.

BRIEF DESCRIPTION OF THE DRAWINGS

Exemplary embodiments of the invention will be explained in more detail hereunder by means of figures in which.

DETAILED DESCRIPTION OF INVENTION

Figure 1:
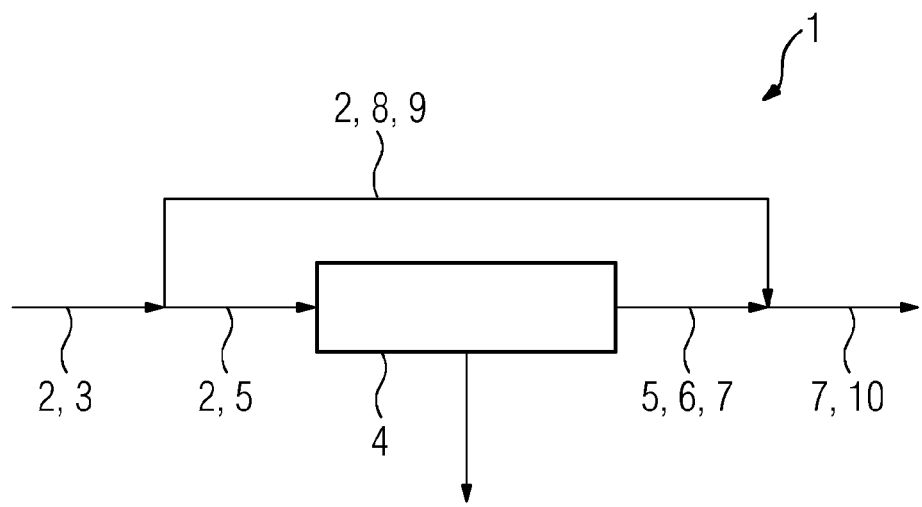
FIG. 1 shows a schematic illustration of a deasphalting device having a bypass line.

FIG. 1 shows the deasphalting device 1 according to the invention for purifying vanadium-containing combustible. The deasphalting device 1 comprises a deasphalting unit 4 which by way of an infeed line 3 is capable of being fed a vanadium-containing combustible 2 which forms a first mass flow 5. A substantially deasphalted combustible 6 is capable of being discharged from the deasphalting unit 4 by way of a discharge line 7.

The deasphalting device 1 moreover comprises a bypass line 8 which connects the infeed line 3 to the discharge line 7 such that the vanadium-containing combustible 2 in a second mass flow 9 is capable of being directed past the deasphalting unit 4. The vanadium-containing combustible 2 by way of the bypass line 8 is fed to the substantially deasphalted combustible 6 from the deasphalting unit 4, mixing so as to form a merged mass flow 10.

The following mass balance applies in the discharge line 7:

$$m_P \times c_P = m_{D,out} \times c_{D,out} + m_{BP} \times c_F \text{ (where } m_P = m_{D,out} + m_{BP})$$

where $m_P$=merged mass flow 10
$c_P$=vanadium concentration in the merged mass flow 10
$m_{D,out}$=first mass flow 5 having a substantially deasphalted combustible 6 (minus vanadium flow $m_A$)

$c_{D,out}$=vanadium concentration of the substantially deasphalted combustible 6
$m_{BP}$ second mass flow 9 having a vanadium-containing combustible
$c_F$ vanadium concentration in the vanadium-containing combustible 2

By virtue of the mixing of the substantially deasphalted combustible 6 ($m_{D,out}$) and the vanadium-containing combustible 2 ($m_{BP}$) so as to form the merged mass flow 10($m_P$), the following applies: since the vanadium concentration in the vanadium-containing combustible 2 ($c_F$) is higher than in the merged mass flow 10($c_P$), the vanadium concentration ($c_{D,out}$) of the substantially deasphalted combustible has to be lower than the vanadium concentration ($c_P$) in the merged mass flow 10. The nominal value $c_P$ is typically in the range of 8 ppm, such that $c_{D,out}$ must be lower than 8 ppm, this by virtue of the readily attainable depletion ratio of 2/3 for typical crude oils having fewer than 24 ppm vanadium being technically implementable.

It applies in general that the higher the vanadium concentration ($c_F$) in the vanadium-containing combustible, the higher the first mass flow 5 ($m_{D,in}$) to be deasphalted must be in order to be able to attain the nominal value ($c_{P,nom}$).

The invention is based on that only one first mass flow 5 ($m_{D,in}$) of the vanadium-containing combustible 2 (crude oil feed flow $m_F$, feed exit concentration $c_F$) is directed as an inlet flow to the deasphalting unit 4 and cleaned therein, while a second mass flow 9 ($m_{BP}$) in the bypass line 8 is directed past the deasphalting unit 4. The advantage of the bypass line 8 lies in particular in that only part of the feed flow ($m_F$) has to be deasphalted. Consequently, the deasphalting unit 4 can be constructed so as to be smaller than in the case of the treatment of the entire mass flow ($m_F$) of the vanadium-containing combustible 2. Accordingly, significantly lower investment and operating costs arise for the cleaning of the oil, on account of which it becomes evident that the implementation of this invention enables an operation in the range of the economical optimum.

For example, if the vanadium concentration in the vanadium-containing combustible 2 ($c_F$) is 12 ppm, in the case of a typical depletion rate of approx. 2/3 vanadium is depleted to ($c_{D,out}$) 4 ppm. When the desired nominal concentration in the merged mass flow 10 ($c_{P,nom}$) is 8 ppm, a ratio between the second mass flow 9 ($m_{BP}$) and the first mass flow 5 ($m_{D,in}$) of 1:1 is predefined in order for the desired mean of 8 ppm to result from 4 ppm and 12 ppm (in reality, $m_{D,in}$ must be slightly higher since a small part of this flow is diverted as a vanadium byproduct and is no longer available in the product oil).

When only half of the vanadium-containing combustible 2 has to be deasphalted, the size of the deasphalting unit 4 can be halved; halved operating costs for the deasphalting can likewise be expected. The economy of the method is heavily improved.

For highlighting, the method variant without a bypass circuit is to be contrasted. Here, the entire vanadium-containing combustible would be fed to the deasphalting unit 4 ($m_{D,in}=m_F$); accordingly, significantly higher investment and operating costs would have to be taken into account for cleaning the oil. The only advantage would lie in a lower vanadium concentration of 4 ppm in the final product stream ($c_P=c_{D,out}$). This extra reduction in the vanadium concentration as compared to the 8 ppm set by way of the bypass line 8 would however enable only minor additional savings in the costs for servicing the gas turbines. Said servicing costs would be significantly lower than the additional costs for the larger deasphalting unit 4 to be dimensioned, on account of which it becomes evident that the variant without the bypass line 8 does not correspond to the economical optimum.

The split ratio between the second mass flow 9 ($m_{BP}$) and the first mass flow 5 ($m_{D,in}$) according to the invention is fixedly set based on a comparison of the vanadium nominal concentration ($c_{P,nom}$) and the given actual concentration ($c_P$).

Figure 2:
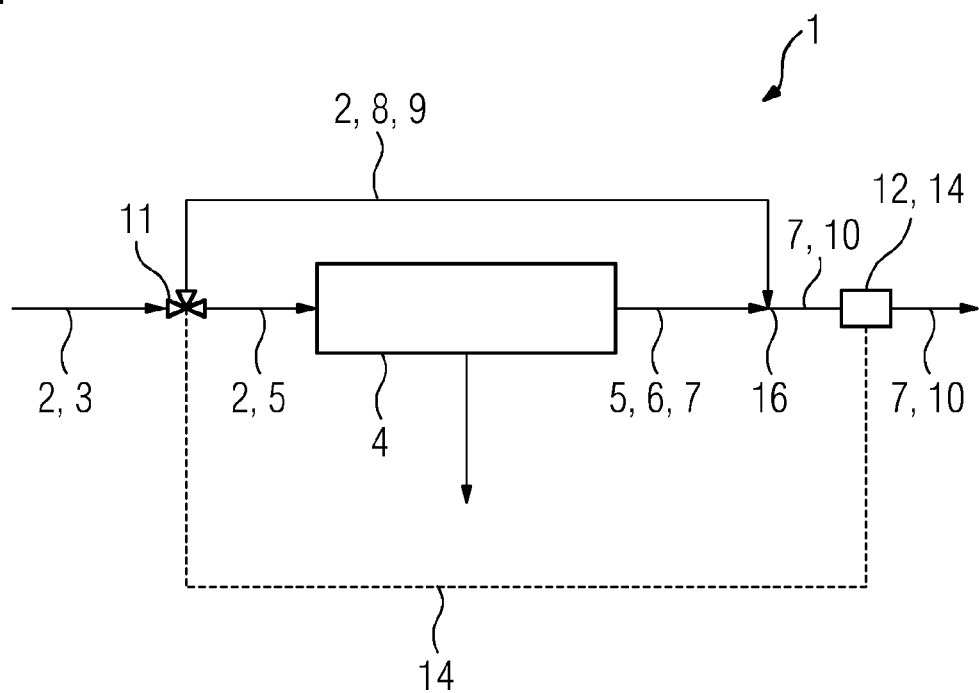
FIG. 2 shows a schematic illustration of a deasphalting device having a bypass line, a control valve, and a measuring device.

FIG. 2 shows the deasphalting device 1 illustrated in FIG. 1, but a measuring device 12 and a control valve 11 disposed in the infeed line 3 are furthermore comprised. The bypass line 8 connects the control valve 11 to a connector 16 in the discharge line. The measuring device 12 in the discharge line 7 is disposed after the connector 16 of the bypass line 8 such that the concentration of vanadium in the merged mass flow 10 is capable of being measured. A ratio between the first mass flow 5 and the second mass flow 9 is capable of being controlled by the control valve 11, proceeding from the concentration of vanadium measured in the merged mass flow 10.

To this end, the vanadium concentration is determined in the measuring device with the aid of an analytical method. An in-line method which enables a fast determination of vanadium and thus fast controlling of this split ratio is advantageously used. In the case of an in-line method not being able to be used, it is possible for the vanadium concentration to be determined by an off-line method and for the measured value ($c_P$) to be subsequently made available to the control valve 11.

The closed control loop for setting the split ratio according to the invention includes a control valve 11 such as a three-way control valve or the combination of two control valves for setting the first and the second mass flow 5, 9 ($m_{D,in}$ and $m_{BP}$).

Figure 3:
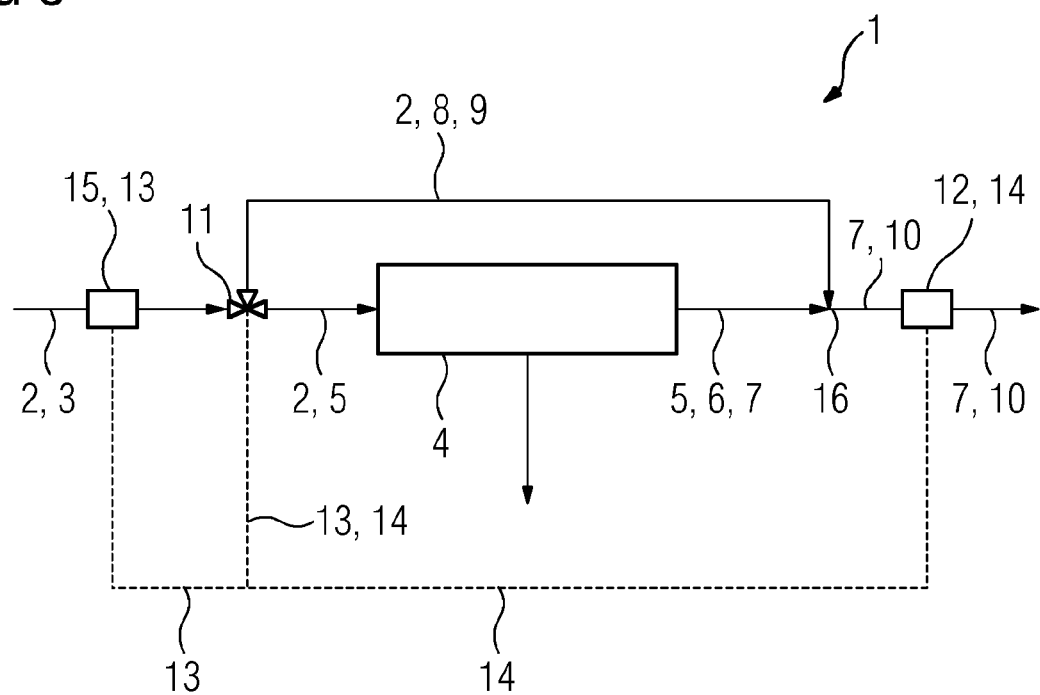
FIG. 3 shows a schematic illustration of a deasphalting device having a bypass line, a control valve, a measuring device ahead of the control valve, and a further measuring device after the connector in the discharge line.

FIG. 3 shows a deasphalting device 1 having a further measuring device 15 which is disposed in the infeed line 3 ahead of the control valve 11. The further measuring device by measuring determines the entry concentration 13 of vanadium in the vanadium-containing combustible 2. The ratio between the first mass flow 5 and the second mass flow 9 is thus capable of being controlled by means of the entry concentration 13 of vanadium and of the exit concentration 14 of vanadium in the combustible.

The vanadium entry concentration 13 ($c_F$) in the vanadium-containing combustible 2 ($m_F$) is thus also measured in addition to the vanadium concentration 14 in the merged mass flow 10 ($c_F$). Both signals can be combined for advantageously controlling the split ratio. As soon as experience values pertaining to the correlation between the split valve setting of the control valve 11 and the typically attained vanadium concentration ($c_P$) in the merged mass flow 10 ($m_P$) are available, the entry concentration 13 ($c_F$) can thus be used for controlling the split ratio in the control valve 11, as long as the exit concentration 14 of the vanadium ($c_P$) does not depart from a permitted bandwidth about the nominal value ($c_{P,nom}$). The advantage of this control mechanism lies in that a significantly faster reaction to changes in the entry concentration 13 is possible.

Both measuring devices 12 and 15 advantageously measure the concentrations ($c_F$ and $c_P$) by way of the same analytical apparatus. In order for in-line analytical methods to be carried out, two specimen lines are installed to this measuring apparatus.

It is thus demonstrated by way of the invention how the technical possibility of implementing high depletion rates can be utilized in a profitable manner.

The invention claimed is:

1. A method for preparing a vanadium-containing combustible, provided for combustion in a gas turbine, in a deasphalting device, the method comprising:
    feeding a vanadium-containing combustible by way of an infeed line to a deasphalting unit, wherein the vanadium-containing combustible fed into the deasphalting unit forms a first mass flow;
    discharging a substantially deasphalted combustible from the deasphalting unit by way of a discharge line;
    wherein a bypass line is connected to the infeed line;
    directing a second mass flow of the vanadium-containing combustible by way of the bypass line in a manner parallel with the first mass flow past the deasphalting unit and feeding to the discharge line, wherein a merged mass flow is formed in the discharge line;
    wherein a control valve is disposed in the infeed line, and the bypass line is connected to the control valve;
    measuring an exit concentration of vanadium in the merged mass flow by a measuring device disposed in the discharge line; and
    controlling a ratio between the first mass flow and the second mass flow by the control valve so as to proceed from the exit concentration of vanadium measured in the merged mass flow.

2. The method as claimed in claim 1,
    wherein an entry concentration of vanadium in the vanadium-containing combustible ahead of the control valve is additionally measured by a further measuring device, and the ratio between the first mass flow and the second mass flow is controlled conjointly with the exit concentration of vanadium in the merged mass flow by the control valve.

3. The method as claimed in claim 1,
    wherein an entry concentration of vanadium in the vanadium-containing combustible is measured.

4. The method as claimed in claim 1,
    wherein the first mass flow is set to approximately 2/3 and the second mass flow is set to approximately 1/3 of the vanadium-containing combustible.

5. A deasphalting device for purifying a vanadium-containing combustible, provided for the combustion in a gas turbine, comprising:
    a deasphalting unit which by way of an infeed line is capable of being fed a vanadium-containing combustible which forms a first mass flow, and from which deasphalting unit a substantially deasphalted combustible is capable of being discharged;
    a bypass line which connects the infeed line to a discharge line such that the vanadium-containing combustible in a second mass flow is capable of being directed past the deasphalting unit and fed to the substantially deasphalted combustible, and a merged mass flow is formed; and
    a measuring device and a control valve disposed in the infeed line;
    wherein the bypass line connects the control valve to a connector in the discharge line, and wherein the measuring device after the connector of the bypass line is disposed in the discharge line such that an exit concentration of vanadium in the merged mass flow is measurable, and a ratio between the first mass flow and the second mass flow is capable of being controlled by the control valve so as to proceed from the exit concentration of vanadium measured in the merged mass flow.

6. The deasphalting device as claimed in claim 5, further comprising:
   a further measuring device disposed in the infeed line ahead of the control valve, an entry concentration of vanadium in the vanadium-containing combustible being capable of being additionally measured by said further measuring device, and the ratio between the first mass flow and the second mass flow being capable of being controlled by the entry concentration of vanadium in the in the vanadium-containing combustible and the exit concentration of vanadium in the merged mass flow.

7. The deasphalting device as claimed in claim 5,
   wherein an entry concentration of vanadium in the in the vanadium-containing combustible is measured.

8. The deasphalting device as claimed in claim 5,
   wherein the first mass flow corresponds to approximately 2/3 and the second mass flow corresponds to approximately 1/3 of the vanadium-containing combustible.

9. The deasphalting device as claimed in claim 5,
   wherein the first mass flow and the second mass flow correspond in each case to approximately half the vanadium-containing combustible.

10. The method as claimed in claim 1,
    wherein the first mass flow and the second mass flow are in each case set to approximately half of the vanadium-containing combustible.

* * * * *